Aug. 19, 1930.  J. B. WIARD  1,773,712
APPARATUS FOR CONTROLLING ELECTRIC MOTORS
Filed Sept. 8, 1927  2 Sheets-Sheet 1
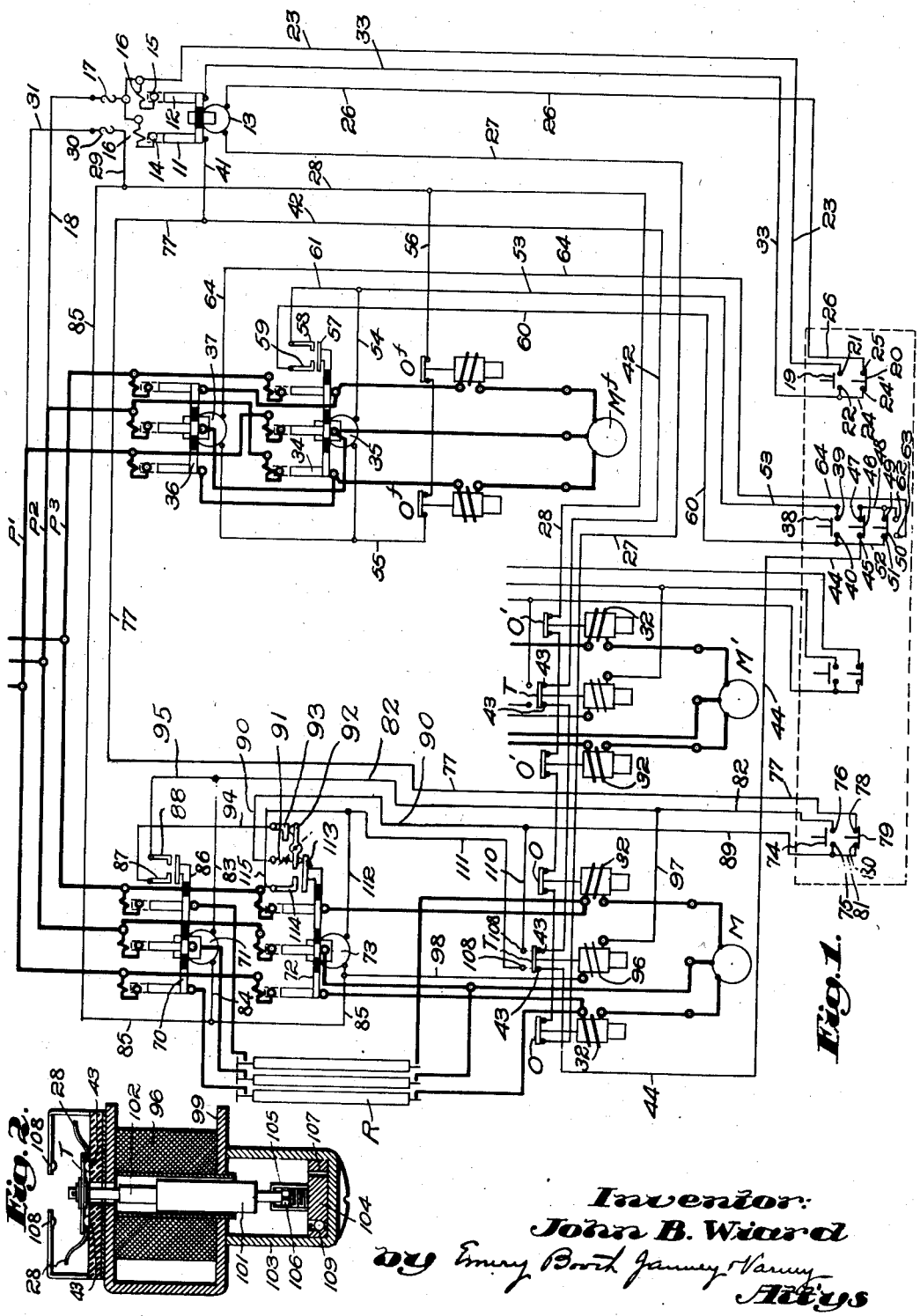

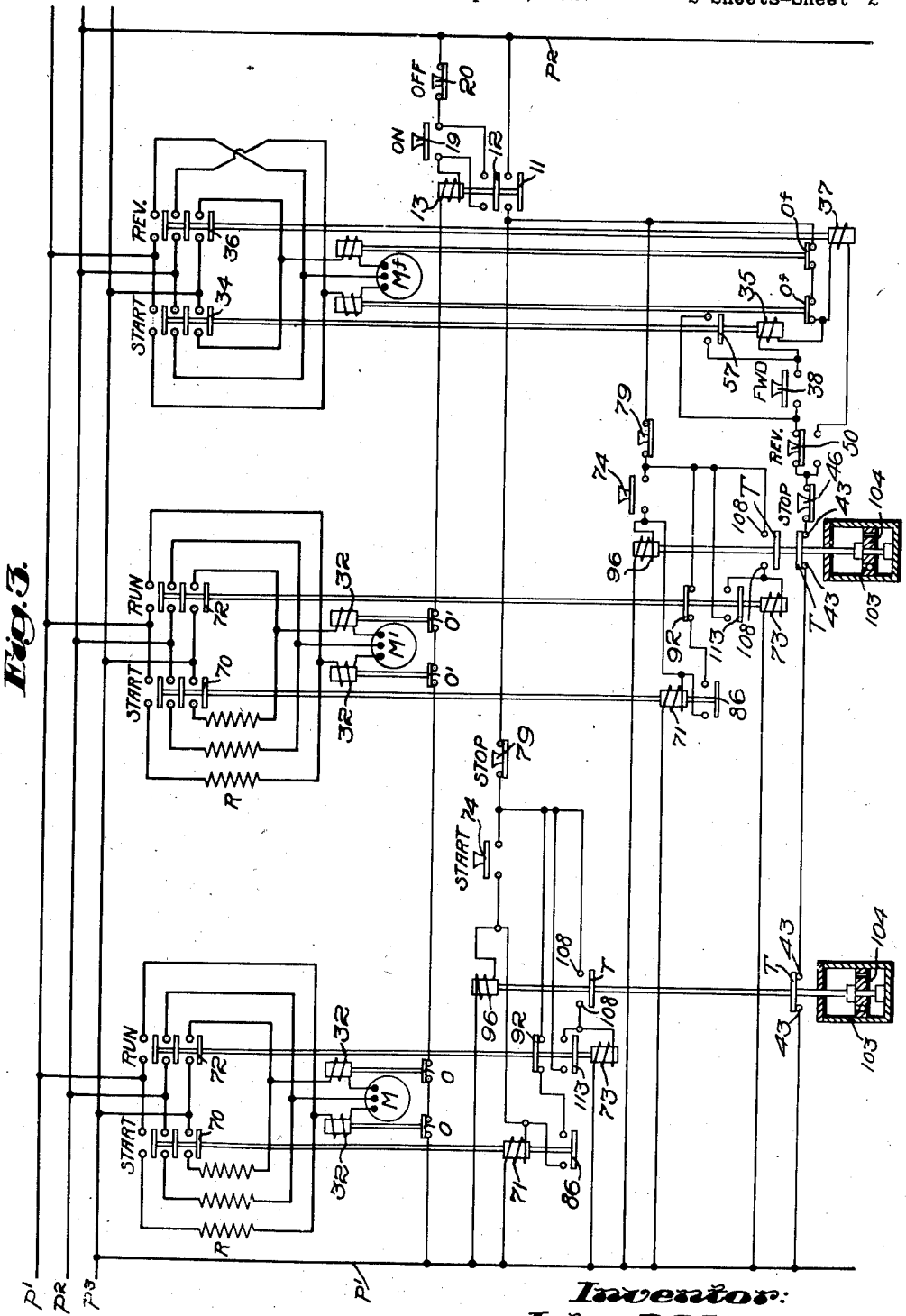

Patented Aug. 19, 1930

1,773,712

UNITED STATES PATENT OFFICE

JOHN B. WIARD, OF LYNN, MASSACHUSETTS

APPARATUS FOR CONTROLLING ELECTRIC MOTORS

Application filed September 8, 1927. Serial No. 218,236.

This invention relates to apparatus for coordinately controlling the starting of different motors of a group so as to automatically prevent the operation of some one or more motors, or of devices driven thereby, during the period that one or more other motors of the group are being started and brought up to speed.

The invention has advantageous application to instances where the operation of one motor may serve to impose a load or duty on one or more other motors of the group, as, for instance, the operation of a motor employed to feed work or material to be acted upon by some instrumentality driven by a second or work motor where the operation of the feed motor is apt to impose an undue load on the work motor if not deferred until the work motor has completed its starting cycle and been brought to a condition where it may assume its normal load. As a specific illustration of such a case there may be instanced the use of motors in a wood-working machine where one motor is employed for driving the feed mechanism and a number of other motors utilized for driving the cutting devices which cut or shape the work when the latter is fed within their working range.

The invention is particularly advantageous in its application to instances where the starting of the motors is performed automatically through remote or indirect control, as through relay-actuated, electro-magnetic devices so arranged that when a push button or other primary starting switch is actuated, a starting connection to a power line is automatically effected, which on the completion of the starting cycle is followed by the automatic change from a starting to a running connection, the completion of the starting cycle being marked by the lapse of a predetermined time or by the reduction of the current input to a normal value or some other factor evidencing the attainment of the running condition.

In such cases the functioning of an automatic starter for a work motor, after having once been initiated by the operator, is outside of his further control except as he may interrupt it, and in many cases he has no means of knowing when the motor has completed its starting cycle and is in readiness to assume its normal load. Danger therefore arises of prematurely imposing a load on the work motor, particularly where there are a number of such work motors, as in the case of a woodworking machine, and where it is customary to start them in rapid succession before starting the feed motor. In such cases the operator is apt inadvertently to start the feed motor before one or more of the work motors is in proper condition to take up its normal duty, thereby prematurely loading the work motors, with possible failure of the starting apparatus or more serious results.

It is desirable, therefore, in such cases that the operation of the feeding mechanism by which the load is imposed upon the work motor or motors be automatically locked out until such motor or motors are ready to perform their normal continuous duty.

In the illustrative embodiment of the invention I have shown several work motors in a group provided each with remotely or indirectly controlled starting means designed to function automatically and complete the starting cycle through the control of a primary starting switch, there being provided means which prevent the operation of an associated feed mechanism after the initiation of the starting cycle of any work motor and until such starting cycle has been completed. By this means not only are the work motors protected against premature loading but the starting of the entire group of motors can be performed more smoothly and expeditiously since the operative has automatic assurance against the inadvertent premature starting of the feed mechanism.

While the invention broadly may have application to instances where the feed mechanism itself is driven from a source of power other than that supplied by an individual feed motor, and to cases where an individual feed motor is employed to drive the feed mechanism, but the starting of the latter is subject to other than indirect or remote control, the same is herein shown for illustrative purposes as embodied in a system where the feed motor is also subject to remote control, the several work motors of the group being provided with automatic starting devices embodying each a magetically-controlled starting switch with starting resistances, which latter are automatically cut out while the motor is connected directly to the power circuit through a magnetically-actuated main switch after the lapse of a suitable time determined by a timing device. The automatic functioning of the timing device is herein also utilized to control the feed motor through its magnetically-actuated starting switch, so that, after the initiation of the starting cycle of any work motor and until its completion, the primary starting switch for the feed motor is rendered ineffective to start the latter, and the feed motor, if already connected to the power circuit, is cut out of operation, the starting circuit for the feed motor, however, being restored to its condition of effectiveness on the completion of the starting cycle of the last work motor which has been set into operation and has attained full speed. The various work motors are often of different sizes requiring different periods of time to complete the starting cycle. The control herein provided, however, prevents the starting of the feed motor until all motors started have been brought to full speed irrespective of the order of starting.

The invention will be best understood by reference to the following description when taken in connection with the accompanying illustration of one specific embodiment thereof, while its scope will be more particularly pointed out in the appended claims.

In the drawings:—

Fig. 1 is a diagrammatic representation of the circuiting arrangement for a group of remotely controlled work motors and an associated feed motor embodying one form of the invention, the controlling device being shown with the general circuiting arrangement adopted in practice;

Fig. 2 is a detail illustrating one of the timing devices employed for controlling a feed motor starting circuit; and Fig. 3 is a diagram suited for more ready reference showing the controlling circuits arranged in simplified across-the line form with the controlling devices conventionally indicated by the same reference characters as in Fig. 1 and in the same functional relationship.

Referring to the drawings (more particularly to Fig. 1) and to the illustrative embodiment of applicant's invention, the same is shown as applied to the individual but coordinated control of a group of work motors M, M', etc., and the associated feed motor M$^f$, the latter being intended to drive the feed mechanism, as, for example, the feed mechanism of a wood-working machine for feeding material to the working instrumentalities, such as cutter heads, the latter independently driven by the several work motors. An obvious extension of the same system of control may be applied to any number of work motors. For simplification a group of two work motors only is herein shown and the starting devices and connections for controlling one of such work motors only is illustrated in detail, the remaining work motor or motors being provided with starting devices and connections similar to the one illustrated in detail.

The three motors indicated in the drawing are of the three phase, squirrel cage induction type and are arranged to be operated from the main alternating-current power lines P', P$^2$, P$^3$, the work motors being provided with automatic starting devices and both work motors and feed motor being indirectly controlled through relay circuits and magnetically actuated switches by primary circuit changing devices, herein in the form of push buttons, the latter being ordinarily located in a panel more or less remote from the motors themselves. The main power circuits, with their connections to the several motors through the starting switches, are shown in heavy lines and, such connections being in the usual conventional form, require no further description except as may be incidental to the explanation of the feed motor control.

The control circuits for the entire group of motors are herein shown subject to the control of a master relay switch and a master relay circuit, which latter must first be closed to render the starting devices for the several motors effective and must remain closed to maintain the line connections of the motors so that all motors of the group may be simultaneously cut out of circuit through the master relay switch. The power for operating the various relay circuits and master relay switch is taken from the main power lines P' and P$^2$.

Referring first to the master relay switch and associated connections, the former comprises the switch contacts 11 and 12 normally held in open circuit position (full lines in Fig. 1) by a spring or gravity or both, but adapted to be thrown by the magnet 13 (dotted line position in Fig. 1) to engage contacts 14 and 15 which are permanently connected to the power line P$^2$ through the blow-out coils 16, fuse 17 and conductor 18.

The magnet 13 is controlled by primary switch means at the control panel, comprising a starting push-button switch 19, normally in open circuit position, and a stop push-button switch 20 normally in closed circuit position.

To close the master relay switch, which is a necessary preliminary to starting any of the motors of the group, the starting push-button 19 is depressed, bridging the contacts 21 and 22. The contact 21 is permanently connected to the power line P² through conductors 23 and 18 so that the actuation of the starting push-button 19 energizes the master relay magnet 13 through a circuit comprising the conductor 23, contact 21, button 19, contact 22, conductor 24, contact 24', normally closed stop push button 20, contact 25, conductor 26, magnet 13, conductor 27, thence through the succession of overload switches O, O, O', O', etc., in the work motor circuits, thence through the conductors 28 and 29, fuse 30 and conductor 31 to power line P'.

The overload switches O, O, O', O' are normally closed, but are adapted to be opened to break the master relay circuit on sustained overload in the power circuits of any one of the several work motors, being subject to the action of the magnet coils 32 contained in two of the three power circuits for each motor. Any suitable overload circuit breakers may be employed, there being herein shown a conventional representation of an overload switch of the type disclosed in Patent No. 1,584,063, dated May 11, 1926.

The momentary depression of the push-button 19 energizes the magnet 13 and closes the master switch, connecting the master relay circuit through the power lines P', and P², rendering it effective for starting the several motors.

When the push-button 19 is released, the master relay circuit is maintained closed so long as the overload switches remain closed and the stop push-button 20 is undisturbed, the circuit being maintained from the power line P², conductor 18, contact 15, switch contact 12, conductors 33 and 24, contact 24', stop push-button 20, contact 25, conductor 26, magnet 13, and thence back to the power line P' through the overload switches O, O, as before. If any overload switch opens or if the stop push-button 20 is depressed at any time, the master relay circuit is immediately opened, the power line P² cut off from the motor control devices, and all motors connected to the lines are immediately disconnected therefrom.

The control connections for the feed motor M', except for the lock-out control through the work motor starting devices, are in conventional form usual in systems of remote control. The feed motor control circuits will first be described.

For control of the feed motor there is provided a normally opened main switch 34 adapted to be thrown to a closed position by the magnet 35 to connect the power lines to the motor for direct drive, there being also provided a motor reverse switch 36 adapted to be thrown by the magnet 37 for connecting the power lines to the motor for reverse drive.

To close the main or direct drive switch 34, the normally open, starting push-button 38 at the control panel is momentarily depressed. This bridges the contacts 39 and 40 and, providing that the starting devices for the work motors are not then functioning, connects the magnet 35 between the power lines P' and P², closing the switch 35 and starting the feed motor.

The circuit which is completed by depressing the push-button 38 is from the power line P² through conductor 18, contact 14, switch contact 11, conductor 41, feed-motor-control circuit 42, thence through normally closed contacts 43 at each of the timer switches T associated with the starting devices of the several work motors, thence returning through circuit 44 to contact 45, through the normally closed, stop push-button 46, contact 47, conductor 48, contact 49, normally closed, reverse push-button 50, contact 51, conductor 52, contact 40, push-button 38, contact 39, conductors 53 and 54, through magnet coil 35, conductor 55, feed motor overload switches O', O', conductors 56, 28, 29 and 31 to power line P'.

If any work motor is passing through its starting cycle when the push-button 38 is depressed, the described motor control circuit is opened at one of the timer switches T, as hereinafter explained, and the feed motor cannot be started, or, if any work motor is started during the operation of the feed motor, the control circuit is immediately opened by the timer switch T and this acts to deenergize the main switch magnet 35 of the feed motor and stop the latter.

After the momentary depression of the push button 38 and the closure of the switch 34, the feed-motor, control circuit is maintained following the release of the push button 38 by means of a bridging switch 57 which is moved with and by the closure of the main motor switch 34 to bridge the stationary contacts 58 and 59. The feed-motor, control circuit is still maintained from the power line P², as before, through the timer switches T, push-buttons 46 and 50 to the conductor 52. Therefrom, however, it extends through the conductor 60 to the contact 59, through bridging switch 57, contact 58, thence through conductor 61 to conductor 54, and thence through the magnet coil 35 to the power line P', as heretofore described.

Since the feed-motor, control circuit passes through the normally closed, stop push-button 46, the circuit may be opened at any time and the feed motor stopped by depressing the stop push button.

To reverse the feed motor, the reverse push button 50 is depressed to open the contacts 49 and 51 and close the reverse contacts 62 and 63. This serves to break the circuit through the main switch magnet 35 and close the circuit through the reverse switch magnet 37. When the reverse push-button 50 is depressed the motor control circuit extends, as previously described, from the power line P² through the timer switches T, back through the stop push-button 46 and conductor 48, but thence extends through the contact 62, push-button 50, conact 63, conductor 64 to magnet coil 37, and thence through conductor 55 back to the power line P', as previously described.

Referring now to the work motors, each motor is provided with automatic starting elements including the starting switch 70 with its actuating magnet 71 adapted when energized to connect the motor to the power lines through suitable starting resistances R, there being also provided the main line switch 72 with its controlling magnet 73 which, on the completion of the staring cycle, determined by the functioning of the timing switch T, is energized to close the switch and connect the motor directly to the power lines independently of the resistances R, the starting switch 70 being simultaneously opened.

This particular arrangement of starting devices herein conventionally shown is illustrative merely of any indirectly controlled automatic starter, the invention being applicable to systems of motor control employing other types of automatic starters, as where the current inrush at starting is regulated by other means, or where a change from a starting connection to a running connection is controlled otherwise than by a timing element, the object broadly being that the feed mechanism or feed motor through some device responsive to the completion of the starting cycle of the work motor should be rendered ineffective until the work motor shall have completed its prescribed automatic starting cycle, however performed and measured, and is in a proper condition to assume its load.

Referring to the illustrative embodiment of the invention, to start a work motor, as the motor M, the master switch 11, 12 having been previously closed as heretofore described, the corresponding starting push 74 is depressed, bridging the contacts 75 and 76. This closes a circuit through the magnet 71, throwing on the starting switch 70 and connecting the motor M to the power lines through the resistances R and overload coils 32.

The magnet circuit thus closed leads from the power line P² through the switch 11, conductors 41 and 77, contact 78, through the normally closed, stop push-button 79, contact 80, conductor 81, contact 75, starting push-button 74, contact 76, conductors 82 and 83 to magnet 71, and thence through conductors 84, 85, 29 and 31 back to the power line P'.

The actuation of the starting switch also actuates an associated bridging switch 86, movable with and by the switch 70, adapted to bridge the stationary contacts 87 and 88, thereby establishing a circuit such that after the release of the starting push button 74 the work-motor-starting circuit is maintained for the duration of the starting cycle through the stop push button 79.

The latter circuit is from the power line P² through push-button 79, as previously described, thence through the contact 80 and conductor 81 to conductors 89, 90 to the conductor 91 flexibly coupled to the pivoted contact arm 92 at the main switch 72, the circuit extending therefrom through the stationary contact 93, conductor 94, contact 87 at the switch 70, bridging switch 86, contact 88 and conductor 95 back to the conductor 83, through magnet coil 71 and back to the power line P', as previously described.

With the closing of the starting switch, the motor commences to accelerate with its current inrush limited by the resistances R and after the lapse of a suitable interval is brought to its normal speed and automatically connected to the power line through the main switch 72. The actuation of the switch 72 is herein automatically controlled by the timing switch T which comprises a bridging switch normally closing the contacts 43 in the feed-motor-control circuit but movable under the influence of the magnet 96 to break such control circuit immediately the starting button 74 is depressed and to maintain the circuit broken until after the starting cycle has been completed and the main starting switch 72 actuated. The magnet 96 is connected in shunt about the starting switch magnet 71, one terminal being connected to conductor 82 by conductor 97 and its remaining terminal to conductor 85 by conductor 98, so that, on the first initiation of the starting cycle by the depression of the button 74, the magnet 96 is energized and instantly breaks the feed-motor-control circuit, the circuit of the magnet 96 however, remaining established after the release of the start push-button by the same connections, heretofore described, in connection with the switch magnet 71, that is to say, from power line P² through switch 11, conductors 41 and 77, contact 78, push button 79, contact 80, conductors 81, 89, 90 and 91, contact arm 92, contact 93, conductor 94, contact 87, bridging switch 86, contact 88, conductors 95 and 97, magnet 96, conductors 98, 85 and 29 to power line P¹.

The timing switch T, with its control magnet, is so arranged that on energization of the magnet the switch is given a substantially instantaneous movement, opening the feed-motor-control circuit. This is followed by a delayed or time-retarded movement which, after the lapse of a predetermined time, results in closing the circuit by which the actuation of the main switch 72 is effected, the switch then automatically returning to its initial position and again closing the feed motor control circuit. The timing switch thus times the functioning of the switches 71 and 72 and controls the duration of the starting cycle, and also acts responsively at the completion of the starting cycle to again render effective the feed-motor-control circuit which it had caused to open on the initiation of the starting cycle.

The general arrangement of the timing switch, conveniently shown in the diagram in Fig. 1, is illustrated in Fig. 2. As there shown, the magnet 96 is supported in the frame 99 and is provided with the vertically movable soft iron core 101, to the upper end of which is connected through the pin 102 the bridging switch T in the form of a metallic disc. Below the frame 77 there depends a cup 103, which contitutes a dash pot cylinder containing oil or other suitable liquid. The lower end of the core is connected to a dash pot piston 104 through a lost motion connection comprising a cap 105 connected to the piston and the headed pin 106 vertically movable within the cap.

When the magnet 96 is deenergized the piston 104 rests in the bottom of the cup, with the core in its lowered position and the disc T resting on the contacts 43, closing the feed-motor-control circuit. When the magnet is energized by the depression of the starting button 74, the core is lifted part way, almost instantaneously breaking the feed-motor-control-circuit at the contacts 43. When the limit of the lost motion connection is reached, however, the head 105 engages the cap 106 and further lifting movement is retarded by the action of the dash pot 104. The latter is provided with one or more leak ports 107 which may be regulated and adjusted to give a desired timing. After the lapse of a predetermined time, the delaying lifting movement of the core will have proceeded far enough to cause the disc to reach the contacts 108, 108, bridging the latter and closing the circuit which moves the main motor switch 72, marking the close of the starting cycle. The magnet 96 being simultaneously deenergized (as hereinafter described), the core 101, by reason of the lost motion connection, immediately drops part way, separating the contacts 108 and immediately thereafter again closes the feed-motor-control circuit at the contacts 43 due to the descent of the dash pot piston. To facilitate the downward movement of the latter, it may be provided with one or more check valves 109, herein shown in ball form, and adapted to open to permit a free flow of oil past the piston on the downward movement of the latter.

When the bridging disc T of the timer engages the contacts 108 a circuit is established through the main switch magnet 73 from the power line P², first through the switch push-button 79 and conductor 90, as previously described, thence through the connection 110, contacts 108, connections 111 and 112, thence through the magnet 73 and connection 85 to the power line P′, as already described.

The closing of the switch 72 not only cuts out the resistances R, but deenergizes the magnet 71, causing the starting switch 70 to open. This is accomplished by the bridging switch 113 carried by the switch 72 and adapted, when the latter is closed, to move the pivoted contact arm 92 to separate the same from the fixed contact 93, thereby breaking the energizing circuit for the magnet 71 and causing the switch 70 to open. The circuit for the timer magnet is simultaneously broken, not only at the contact 93 but also at the contacts 87 and 88, due to the withdrawal of the bridging switch 86 therefrom on the opening of the starting switch 70.

With the closing of the switch 72 an energizing circuit for its magnet is established independently of the timer control circuit by the action of the bridging switch 113 which connects the pivoted contact arm 92 through the stationary contact 114 and conductor 115 with the magnet conductor 112.

The work motor M has now been brought up to speed, the starting cycle completed and its switch control circuit through the magnet 73 permanently established until such time as the stop push-button 79 may be depressed or the master relay circuit opened. The timer plunger drops back by gravity to its original position, where it again closes the feed-motor-control circuit, placing the latter in position to start the feed motor so far as the starting of the work motor M is concerned.

The feed motor control circuit passes through the timer switches T of all the work motors of the group, so that, after the attempted starting of any one of the work motors the feed motor starting circuit becomes dead and the feed motor cannot be started until the starting cycle of that work motor has been completed and until its timer has returned to its normal position. If the feed motor is in operation when the starting of any work motor is attempted it is immediately cut out of circuit.

From the foregoing it will be seen that the depression of the starting button for any work motor acts simultaneously with the energization of the timer and the actuation of the work-motor-starting switch to open the feed motor circuit. The delayed movement of the timer, following its initial breaking of the feed-motor-control circuit, permits the work motor to be brought up to speed. At the end of the predetermined time, the timer functions, throwing the main switch 72 and establishing the running connections for the motor, this in turn opening the starting switch 70 and effecting the deenergization of the timer, which latter in turn is followed by the re-establishment of the feed-motor-control circuit.

In starting up such a group of motors, therefore, the several push buttons for the work motors may be pressed in as rapid succession as is desired but, until the starting cycles for all motors started are completed, the feed-motor-control circuit is dead, its motor cannot be started and all work motors are protected against overload due to the premature starting of the feed.

In Fig. 3 there is shown a simplified circuiting diagram where the control devices, including the switches, switch magnets, push buttons, etc., are designated with reference characters corresponding to those employed in Fig. 1, their functional relationship, however, being the same as that already described in connection with Fig. 1.

While I have herein shown and described one specific embodiment and one particular application of my invention, it is to be understood that extensive deviations may be made from the form herein illustrated and numerous other applications may be made of the same, all without departing from the spirit thereof.

I claim:

1. The combination with a plurality of motors with controlling devices therefor comprising for each motor a magnetically-operated line switch with controlling circuits and primary circuit-changing means, automatic starting devices for each motor comprising a starting resistance, a magnetically-actuated, starting switch controlled by said primary starting means for connecting the motor to the line through said starting resistance, a plurality of magnetically-operated timer devices, including one for each motor actuated by the starting of said motor to connect the same to the line independently of the starting resistance after a predetermined time interval, a motor adapted through its operation to impose a load on said plurality of motors, a magnetically-actuated line switch therefor on the closure of which depends the operation of said last named motor, a switch-controlling circuit therefor and means acting through said several timer devices for opening said switch-controlling circuit on the starting of any one of said plurality of motors and for again closing said circuit only after the lapse of time interval determined by said timer device.

2. The combination with a plurality of motors of controlling devices including a magnetically-operated, line switch and automatic starting means for each motor, a plurality of timer means, one for each automatic starting means determining the starting cycle thereof, a device the operation of which is adapted to impose a load on said plurality of motors and means subject to the control of said several timer means for preventing the operation of said device until the timer means for any motor started has marked the completion of the starting cycle.

3. The combination with a group of motors including a plurality of motors and another motor the operation of which is adapted to impose a load on each of said plurality of motors, of a magnetically actuated starting switch with its control device for each of said plurality of motors for separately and independently connecting each motor to a power line to start the same either separately or in overlapping operation in any desired order or time relation, automatic starting devices for each of said motors to limit the current output until the motor has attained a substanially normal speed, a magnetically actuated starting switch for said other motor and normally operable independently of the operation of said plurality of motors, and circuit connections rendered effective during the functioning of any one or more of said automatic starting devices and controlling the starting switch for said other motor to prevent the operation of said other motor during the functioning of said automatic starting device or devices.

4. The combination with a group of motors including a plurality of motors and another motor the operation of which is adapted to impose a load on each of said plurality of motors, of magnetically actuated starting switches with control devices for separately and independently connecting each of said plurality of motors to a power line to start the same either separately or in overlapping operation in any desired order or time relation, a magnetically actuated switch with its control device to start said other motor and normally operable independently of the operation of said plurality of motors, and means effective on the starting of any of said plurality of motors to prevent for a limited but substantial time interval during the starting thereof the simultaneous operation of said other motor.

5. The combination with a plurality of motors, each being provided with a magnetically actuated starting switch and control devices therefor, means for starting the individual motors either separately or in overlapping operation in any desired order or time relation, another motor with its magnetically actuated starting switch and control devices therefor, and automatic means to prevent the operation of said other motor for a substantial time interval during the starting of any of said plurality of motors.

6. The combination with a plurality of motors of a device the operation of which is adapted to impose a load on any of said plurality of motors in operation, magnetically actuated starting switches with control devices for separately and independently connecting each of said plurality of motors to a power line to start the same either separately or in overlapping operation in any desired order and time relation, an automatic starting device for each motor to set in operation with the actuation of its starting switch and provided with means to limit the current input until the motor has attained substantially normal speed, and automatic means rendered effective with the actuation of said automatic starting device and effective during the functioning thereof to prevent simultaneous operation of said load-imposing device.

7. The combination with a plurality of motors each with its magnetically actuated starting switch and control devices, of another motor with its magnetically actuated starting switch and control devices, automatic means for each of said plurality of motors dependent on the starting of its associated motor to prevent for a substantial time interval during the starting thereof the starting of said other motor, if at rest, or to stop the same, if running.

8. The combination with a plurality of motors with individual starting devices therefor, of another motor, a plurality of separate timer devices associated, one each with the starting device of each of said plurality of motors, means controlled by each of said timer devices dependent on the starting of its associated motor to prevent the operation of said other motor for a substantial time interval during the starting thereof.

9. The combination with a motor having a magnetically actuated starting switch, of a second motor with its magnetically actuated starting switch, automatic starting means for the first motor set in operation with the actuation of its starting switch and provided with means to limit the current input until the motor has attained substantially normal speed, and automatic means rendered effective with the actuation of said automatic starting device and effective during the functioning of the starting device of said first motor both to prevent the starting of said second motor, if at rest, and, if in operation, to stop its operation.

10. The combination with a motor, of means for starting the same including a magnetically actuated starting switch, a timer switch associated therewith, a second motor with means, also including a magnetically actuated switch, for starting the same normally operable independently of the starting means for said first motor, and a circuit controlling the starter for the second motor operatively related to said timer switch to stop the second motor, if running, or to prevent its operation, if at rest, during the starting of said first motor.

11. The combination with a group of motors, including a plurality of motors, and another motor adapted to impose a load on said plurality of motors, automatic starting means including a magnetically actuated retarded-movement timer switch for each of said plurality of motors to determine the completion of the starting cycle, means for starting said motors either separately or in overlapping relation in any desired order or time relation, and means for automatically preventing the operation of said other motor during the starting cycle of any of said plurality of motors, including a controlling circuit for said other motor controlled by the said several timer switches.

12. The combination with a group of motors, including a plurality of motors, and another motor adapted to impose a load on said plurality of motors, magnetically actuated automatic starting means including magnetically-actuated timer switches, one for each of said plurality of motors, movable to determine the completion of the motor starting cycle, a circuit determining the operative connection of the other motor to the line circuit changing connections controlling said circuit subject to the action of said several timer switches and, in the normal position of the latter, ineffective for preventing the operation of said second motor, means for magnetically actuating each timer switch independently of the other on the initial starting of its respective motor, and retarding devices permitting said switch an initial unretarded movement in its normal position followed by a retarded movement to its cycle determining position, and permitting its return to its normal position at the end of the starting cycle, thereby to act through said circuit changing connections to prevent the operation of said other motor during the starting of any of said plurality of motors.

13. The combination with a group of motors, including a plurality of motors, and another motor adapted to impose a load on each of said plurality of motors, starting means for each of said motors, timing means to determine the starting cycle of each of said plurality of motors, starting means for said other motor, and means whereby said other motor, if it is at rest, is prevented from starting during the starting cycle of any of said plurality of motors, or, if operating, is cut out of operation by the act of starting any one of said plurality of motors.

14. The combination with a group of motors, including a plurality of motors, and another motor adapted to impose a load on said plurality of motors, individual starting devices for each of said group of motors normally operable each to start its motor independently of the operation of the remaining motors of the group, and means effective through the act of starting any of said plurality of motors to prevent the operation of said other motor for a substantial time interval during the starting of the aforesaid one of the plurality of motors.

15. The combination with a plurality of motors, of another motor, each having starting devices comprising a magnetically actuated starting switch, primary circuit controlling devices for separately and independently connecting each of said motors to a power line to start the same in any desired order, and automatic means effective through the act of starting any of said plurality of motors to prevent the starting of said other motor, if at rest, or, if in operation, to stop its operation, for a substantial time interval following the starting of any of said plurality of motors.

16. The combination with a motor having starting means comprising a magnetically actuated starting switch and controlling devices therefor, of a second motor having starting means also comprising a magnetically actuated starting switch and controlling devices therefor, a timer device associated with the starting switch of said first motor, and automatic means effective through the act of starting said first motor for preventing the starting of said other motor, if at rest, or, if in operation, to stop its operation, for a substantial time interval following the starting of said first motor.

17. The combination with a motor having automatic starting means, including a magnetically-actuated, retarded-movement timer switch to determine the completion of the starting cycle, of a second motor, and means operative during the starting cycle of said first motor for automatically stopping said second motor if running, or for preventing its operation if at rest, said means including a controlling circuit for the second motor having circuit changing devices actuated on the initial movement of said timer switch to change said controlling circuit and to reestablish the same only on the completion of its retarded movement.

18. The combination with a motor having starting means, of a second motor also having its starting means, and means associated with the starting means of said first motor, and effective for a substantial time interval during the starting cycle of said first motor, both to prevent the starting of such second motor if at rest, and, if in operation, to stop its operation, said last named means being effective only during the starting cycle of said first motor.

19. The combination with a motor having a magnetically actuated starting switch and a control device therefor, of automatic starting means set in operation with the actuation of its starting switch and provided with means to limit the current input until the motor has attained substantially normal speed, a second motor with its magnetically actuated starting switch and controlling devices, and means effective only during the starting of said first motor, both to prevent the starting of said second motor, if at rest, during the functioning of said automatic starting means, and, if in operation, to stop its operation.

In testimony whereof, I have signed my name to this specification.

JOHN B. WIARD.